(12) United States Patent
Kanuma (10) Patent No.: US 7,537,238 B2
(45) Date of Patent: May 26, 2009

(54) SIDE AIRBAG

(75) Inventor: Tadao Kanuma, Shizuoka (JP)

(73) Assignee: Nihon Plast Co., Ltd., Fuji-shi (JP)

( * ) Notice: Subject to any disclaimer, the term of this patent is extended or adjusted under 35 U.S.C. 154(b) by 0 days.

(21) Appl. No.: 09/924,943

(22) Filed: Aug. 9, 2001

(65) Prior Publication Data

US 2002/0020992 A1 Feb. 21, 2002

(30) Foreign Application Priority Data

Aug. 10, 2000 (JP) ............... 2000-242120
Jun. 20, 2001 (JP) ............... 2001-185725

(51) Int. Cl.
*B60R 21/16* (2006.01)

(52) U.S. Cl. .............. 280/728.1; 428/34.1; 442/79

(58) Field of Classification Search ............ 383/3; 442/76, 108, 149, 164, 167, 168, 169, 170, 442/171, 172, 182, 189, 203, 218, 220, 224, 442/239, 254, 255, 260, 261, 284, 293, 301; 280/728.1; 428/34.1, 34.3, 35.2, 35.7, 36.1, 428/36.2, 36.8, 36.91, 44, 47, 48, 53, 101
See application file for complete search history.

(56) References Cited

U.S. PATENT DOCUMENTS

| 4,587,354 | A | 5/1986 | Takago et al. | |
| 5,359,735 | A | 11/1994 | Stockwell | |
| 5,482,317 | A | 1/1996 | Nelsen et al. | 280/743.1 |
| 6,177,366 | B1 * | 1/2001 | Li | 442/71 |
| 6,283,507 | B1 | 9/2001 | Kami et al. | |
| 6,420,037 | B1 * | 7/2002 | Tsuji et al. | 428/447 |

FOREIGN PATENT DOCUMENTS

| DE | 41 34 995 C1 | 3/1993 |
| EP | 0 866 164 A1 | 9/1998 |
| EP | 0 962 363 A1 | 12/1999 |
| JP | 2-114035 | 4/1990 |
| JP | 10-129380 | 5/1998 |
| JP | 11-227550 | 8/1999 |
| JP | 2001-1854 | 1/2001 |
| WO | WO 98/12075 A1 | 3/1998 |
| WO | WO 99/14082 A1 | 3/1998 |
| WO | WO 99/28164 A1 | 6/1999 |

* cited by examiner

*Primary Examiner*—Arti Singh-Pandey
(74) *Attorney, Agent, or Firm*—Foley & Lardner LLP (57) ABSTRACT

A side airbag includes two main-body fabrics superimposed to have one sides opposed to each other and including a textile having 400 dtex or less yarn, 200 g/m² or less weight, and 2,000 or more cover factor, thermosetting silicone placed at least one sides of the two fabrics, and solventless addition room-temperature-vulcanizing adhesive silicone interposed between the two fabrics at a junction and having 20 or less JIS-A hardness and 800% or more initial fractural elongation after cure.

27 Claims, 4 Drawing Sheets

| | Specifications of Textile | | | | Joining Method for Main-Body Fabric | Adhesive-Silicone Characteristics | | | | | Airbag Characteristics | | |
|---|---|---|---|---|---|---|---|---|---|---|---|---|---|
| | Yarn (dtex) | Weaving Density (yarns/inch) | Cover Factor (CF) | Weight (g/m²) | | Type of Reaction | Hardness (JIS-A) | Initial Fractural Elongation ($E_0$) | $E/E_0$ 250h | $E/E_0$ 500h | Deployment Test (Damage at Junction(s)) | Airtightness (Relative Value) | Folded Thickness (Relative Value) |
| Example 1 | 235 | 68 × 67 | 2070 | 135 | Adhesive Silicone | Addition RTV | 10 | 1250 | 0.98 | 0.96 | No damage | 100 | 100 |
| Example 2 | 155 | 95 × 93 | 2340 | 126 | Ditto | Ditto | Ditto | Ditto | Ditto | Ditto | Ditto | 102 | 85 |
| Comparative Example 1 | | | | | Reactive Hot Melt | | | | | | Peripheral junction peeled off at several spots | (Impossible measurement) | 102 |
| Comparative Example 2 | 235 | 68 × 67 | 2070 | 135 | Silicone Filling After Sewing | Addition RTV | 10 | 1250 | 0.98 | 0.96 | No damage | 3 | 119 |
| Comparative Example 3 | | | | | Adhesive Silicone | Addition Thermosetting | 35 | 510 | 0.86 | 0.77 | Ditto | 93 | 105 |
| Comparative Example 4 | | | | | Ditto | Condensation RTV | 41 | 380 | 0.63 | 0.51 | Peripheral junction peeled off at one spot | 24 | 107 |
| Comparative Example 5 | | | | | Ditto | Addition RTV | 28 | 720 | 0.75 | 0.64 | Ditto | 37 | 103 |

FIG.6

| | SPECIFICATIONS OF TEXTILE | | | | ADHESIVE-SILICONE CHARACTERISTICS | | | | | | AIRBAG CHARACTERISTICS | | |
|---|---|---|---|---|---|---|---|---|---|---|---|---|---|
| | YARN (dtex) | WEAVING DENSITY (yarns/inch) | COVER FACTOR (CF) | WEIGHT (g/m²) | TYPE OF REACTION | HARDNESS (JIS-A) | INITIAL FRACTURAL ELONGATION ($E_0$) | $E/E_0$ 250h | $E/E_0$ 500h | DEPLOYMENT TEST (DAMAGE AT JUNCTION(S)) | AIRTIGHTNESS (RELATIVE VALUE) | FOLDED THICKNESS (RELATIVE VALUE) |
| EXAMPLE 3 | 350 | 62 X 62 | 2320 | 190 | ADDITION RTV | 10 | 1250 | 0.98 | 0.96 | NO DAMAGE | 100 | 100 |
| EXAMPLE 4 | 235 | 75 X 75 | 2299 | 155 | DITTO | DITTO | DITTO | DITTO | DITTO | DITTO | 98 | 87 |
| EXAMPLE 5 | 350 | 62 X 62 | 2320 | 190 | DITTO | 16 | 1040 | 0.85 | 0.73 | DITTO | 100 | 102 |
| COMPARATIVE EXAMPLE 6 | 470 | 54 X 54 | 2341 | 215 | DITTO | 10 | 1250 | 0.98 | 0.96 | DITTO | 102 | 124 |
| COMPARATIVE EXAMPLE 7 | 400 | 49 X 49 | 1960 | 190 | DITTO | DITTO | DITTO | DITTO | DITTO | SILICONE PEELED OFF AT PERIPHERY & COCOON-LIKE JUNCTIONS TO HAVE SEAMS EXPOSED | 7 | 90 |
| COMPARATIVE EXAMPLE 8 | 400 | 62 X 62 | 2320 | 190 | CONDENSATION RTV | 41 | 380 | 0.68 | 0.51 | SILICONE PEELED OFF AT PERIPHERAL JUNCTION | 26 | 109 |

SIDE AIRBAG

BACKGROUND OF THE INVENTION

The present invention relates to airbags for reducing an impact of passengers or occupants against interior vehicle components in the event of side collision of motor vehicles.

Recently, airbag systems come into wide use as passenger restraint systems, and are available for various seat positions such as driver's seat, assistant driver's seat and rear seat to cope with not only frontal collision, but side collision of motor vehicles. Particularly, airbags for reducing an impact of passengers in the event of side collision (refer hereafter to as side airbags) receive attention as means for increasing the security of passengers.

However, as being deployed in a narrow space between a passenger's seat and a vehicle body, the side airbags need to restrain passengers with small shape and volume thereof. Thus, it is necessary to avoid raising a problem that unnecessarily expanded airbags upon deployment disable full absorption of an impact energy of passengers, or come in contact with the passengers to provide an impact to them.

The side airbags or inflatable curtains deploy along a side window and cover the whole or part thereof to prevent passengers from strongly colliding with the side window and the neighborhood thereof. In order to cover the passenger's head even if the vehicle body rolls due to a side-collision impact, the inflatable curtain needs to have high airtightness to such an extent that no gas leakage occurs from a bag over a few seconds after deployment. Thus, a bag fabric or cloth for the inflatable curtain is coated with silicone resin or rubber.

With the inflatable curtain accommodated in the vehicle body on the periphery of the side window, an extremely narrow accommodation space of a pillar and a roof side requires a reduction in bulk and sectional area of a folded bag. If the bag is designed to use a fabric for an earlier-art driver's seat or assistant driver's seat airbag, the accommodation of the folded bag requires partial alteration of the vehicle-body structure design or arrangement of a separate and distinct accommodation unit.

JP-A 10-129380 discloses a joining method of an outer periphery of a side airbag using a fabric coated with silicone rubber, wherein a sewed portion is sealed with a sealing member to increase the airtightness. This method provides an airbag with very tough outer periphery for higher airtightness, which is apt, however, to be rough and hard, and is difficult to reduce a folded volume.

JP-A 2-114035 discloses an airbag fabric having improved airtightness by laminating thermoplastic elastomer. According to a type of thermoplastic elastomer, the fabric may cause adhesion between fabric portions or lack of heat resistance to hot gas out of an inflator after leaving the airbag folded during a long period of time.

JP-A 11-227550 discloses a bonded airbag wherein the periphery of a fabric coated with silicone rubber is joined with a hot-setting silicon-rubber adhesive to have a junction peeling bonding strength of 150 N/25 mm width or more. In order to obtain a predetermined bonding strength, this art relies upon 1) introducing a coating rubber into a texture of the fabric, and 2) enhancing cross-linking and chemical bond between the fabric and a coating layer and between the coating layer and an adhesive by using a specific rubber mixing compound. However, the cured coating rubber and adhesive make the periphery of the fabric significantly rough and hard, scarcely securing a reduced folded volume to be achieved by the present invention.

JP-A 2001-1854 discloses an airbag wherein two panels are joined with thread sewing and a resilient adhesive having 200% or more fractural elongation so as to prevent a gas leakage from a sewed portion of the panels. This airbag provides greater fractural elongation, but cannot satisfy the requirements for endurance characteristics.

U.S. Pat. No. 5,482,317 discloses an inflatable protective cushion using a fabric of nylon 66 of 50-155 dtex. The weight of the fabric is half or less an earlier-art airbag fabric, which is superior in the earlier-art level in view of a weight reduction, but inferior therein due to lack of mechanical characteristics of the fabric itself. This cushion is of a rectangular outer peripheral shape to remove sewing on the outer periphery and thus secure the pressure tightness of the cushion. It is difficult, however, to apply the cushion to complicatedly shaped bags such as side airbag.

SUMMARY OF THE INVENTION

It is, therefore, an object of the present invention to provide soft and lightweight side airbags having higher airtightness, smaller folded volume, and excellent endurance by means of a simple manufacturing method.

The present invention provide generally an airbag for a motor vehicle, comprising:
   two portions which form a main body of the airbag, the two portions being superimposed to have one sides opposed to each other, the two portions comprising a textile, the textile having 400 dtex or less yarn, 200 g/m² or less weight, and 2,000 or more cover factor;
   a first silicone placed at least the one sides of the two portions, the first silicone comprising a thermosetting silicone; and
   a second silicone interposed between the two portions at a junction, the second silicone comprising a solventless addition room-temperature-setting adhesive silicone, the second silicone having 20 or less JIS-A hardness and 800% or more initial fractural elongation after cure.

An aspect of the present invention is to provide a motor vehicle, comprising:
   an airbag mounted in a vicinity of a side window of the motor vehicle, the airbag comprising:
   two portions which form a main body of the airbag, the two portions being superimposed to have one sides opposed to each other, the two portions comprising a textile, the textile having 400 dtex or less yarn, 200 g/m² or less weight, and 2,000 or more cover factor;
   a first silicone placed at least the one sides of the two portions, the first silicone comprising a thermosetting silicone; and
   a second silicone interposed between the two portions at a junction, the second silicone comprising a solventless addition room-temperature-setting adhesive silicone, the second silicone having 20 or less JIS-A hardness and 800% or more initial fractural elongation after cure.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a side airbag embodying the present invention will be described. The side airbag comprises a fabric or cloth which forms a bag main body and is coated with thermosetting silicone with excellent heat resistance and physical properties to secure the airtightness. Due to insufficient adhesion to a textile for forming the fabric, room-temperature-vulcanizing (refer hereafter to as RTV) silicone placed on the textile surface can causes an inconvenience when carrying out continuous setting. Thermosetting silicone may be of any type such as solvent type, solventless type or water-dispersion type. A typical example is addition high molecular-weight liquid silicone.

In the present invention, it is necessary to use fine yarn of 400 dtex (=360 denier) or less, preferably, 235 dtex (=210 denier) or less for the bag fabric. When using yarn thicker than 400 dtex, a folded volume of the bag cannot be reduced.

The weight of the main-body fabric of the bag should be 200 g/m$^2$ or less, preferably, 150 g/m$^2$ or less. The weight more than 200 g/m$^2$ makes a weight reduction of the bag difficult.

The cover factor (CF) given by the thickness (dtex) of yarn of a textile and the weave density (yarns/inch) thereof should be 2,000 or more, preferably, 2,000-2,600. When the cover factor is less than 2,000, the texture becomes rough, and thus the silicone amount is increased to ensure the airtightness. This results in not only increased weight of the fabric, but possible occurrence of the textile displacement when the airbag deploys explosively, which may cause damage of junctions. On the other hand, when the cover factor is more than 2,600, the textile becomes very rough and hard to reduce the folded volume.

The cover factor of a textile is an index which shows the compactness of the texture thereof, and is given by the thicknesses (dtex) of warp and weft (Dw and Df) of the textile and the numbers of warp and weft (Nw and Nf) thereof:

$$CF = \sqrt{Dw} \times Nw + \sqrt{Df} \times Nf$$

In the present invention, for an adhesive used in adhesion of a superimposed junction of the man-body fabric, it is essential to adopt solventless adhesive silicone. Solvent silicone requires volatilization of solvent for a material to expand thermosetting silicone placed on the main-body fabric, leading to possible reduction in the airtightness of the fabric itself or in the adhesion to the textile for forming the fabric. Solventless silicone does not raise such problem, and is safe and sure in view of the working environment.

Adhesive silicone should be addition or addition-based RTV silicone. Some addition silicones are thermosetting, which have the advantage of shorter cure time, but require a heating process. Moreover, during the heating process, owing to the amount of thermosetting silicone interposed in the superimposed junction of the main-body fabric, i.e. application thickness, tiny air bubbles incorporated in a silicone layer during application can expand by heating and remain therein to degrade the airtightness at the superimposed junction and the adhesion with a coating layer of the fabric. Generally, condensation RTV silicone of the one-liquid type which cures by reaction with atmospheric moisture tends to be slow in cure and difficult to obtain the uniform cure degree when the application amount is great, leading to nonuniform adhesion with the fabric. Moreover, condensation silicone is typically lower in heat resistance after cure than addition silicone.

In the present invention, it is desirable to use adhesive silicone having JIS-A hardness after cure of 20 or less, preferably, 2-15, and initial fractural elongation of 800% or more, preferably, 1,000-1,500%. The use of extremely soft silicone allows preservation of the flexibility at the junctions to obtain a reduced folded volume. With JIS-A hardness of more than 20, the flexibility becomes insufficient at the junctions, which may lead to larger folded volume.

The initial fractural elongation of 800% or more provides an operation of alleviating an impact of a peeling force and a shearing force produced explosively upon deployment of the airbag by elongation of silicone applied to the junctions. With the initial fractural elongation of less than 800%, sufficient alleviating operation is difficult to expect.

For achieving this alleviating operation during a long period of time, it is essential that adhesive silicone shows less variation in the high elongation characteristics due to an environmental affection It is preferable that a ratio of an initial fractural elongation Eo (%) to a fractural elongation E (%) after 250 h treatment at 100° C. after cure is 1:0.8 or more (i.e. E/Eo≧0.8), preferably, 1:0.9 or more (i.e. E/Eo≧0.9). More preferably, the ratio E/Eo of the initial fractural elongation Eo to E after 500 h treatment at 100° C. after cure is 1:0.8 or more. The ratio of 1:0.8 or more (E/Eo≧0.8) allows always resilient joining of the superimposed junction of the main-body fabric to reduce an impact produced at the junctions upon abrupt deployment of the airbag.

In the present invention, it is more preferable to apply not only joining with adhesive silicone, but reinforcing or thread sewing to at least part of the superimposed junction of the main-body fabric, e.g. outer peripheral junction, bag inside junctions, and periphery of an inflator mounting hole which undergo a bag internal pressure and an impact force upon deployment of the airbag. Sewing the superimposed junction with adhesive silicone interposed therein allows firm airtightness without providing a sealing compound or the like along seams and the inside of an outer seam of the sewed outer periphery after sewing.

In the present invention, any method of providing thermosetting silicone to a textile for forming the main-body fabric may be applied if it secures joining with the textile and airtightness of a coating layer. Examples of the method are coating such as knife, kiss, reverse or comma coating, printing such as screen, roll or rotary printing, dipping, and splaying.

The amount of thermosetting silicone applied to a textile can be determined in the range of 10-100 g/m$^2$ (on the basis of solid matter) in accordance with the required airtightness and heat resistance.

Adhesive silicone for joining the superimposed junction of the main-body fabric may be placed on thermosetting silicone at the junctions to have 100-1,000 g/m$^2$ application amount (on the basis of solid matter) or 0.1-1.2 mm application thickness. Moreover, the application amount or thickness may be the same at the whole junctions, or may be varied such that it is greater at a superimposed portion (4a-4d in FIG. 1) of the main-body fabric which is apt to undergo a greater peeling force than at the peripheral junction (3 in FIG. 1).

The application width of adhesive silicone can be determined in the range of, e.g. 1040 mm in accordance with a joining portion, joining width, and the like. When sewing the junctions after application of adhesive silicone, the innermost seam of a sewed portion may be positioned, e.g. 5-20 mm away from an inner end of the application width.

The method of applying adhesive silicone can be selected from various methods such as method using a trowel, method using a nozzle such as air gun, and method using a screen.

As described above, adhesive silicone used in the present invention should be solventless and addition or addition-based RTV silicone. Though like paste, such silicone differs from rubber glue obtained by dissolving and diluting a polymer with solvent in that no solvent volatilizes. This feature is desirable in view of the working environment. Two types of addition RTV silicone are available for intended use: two-liquid type containing a mixture of silicone and curing component such as curing agent and catalyst, and one-liquid type which allows a reduction in cure time. Though addition RTV silicone cures at the room temperature, it differs from one-liquid type condensation silicone which reacts moisture in the air in that the cure rate can be adjusted by added curing agent, having cure rate and uniformity superior to condensation silicone.

Any solventless addition RTV silicone is available if it satisfies the requirements on adhesion with thermosetting silicone applied on the main-body fabric, heat resistance, flexibility, and the like. One example of such silicone contains vinyl dimethylpolysiloxane as a main agent, hydrogen-silane-radical (≡Si—H) containing compound as a cross-linking agent, platinum compound as a curing catalyst, and the like.

The viscosity, cure time, post-mixing pot life and the like of applied silicone can appropriately be determined by determining a kind and molecular weight of silicone, a kind and amount of added curing agent, and the like in view of the liquid viscosity, application workability, characteristics after cure, and the like. Silicone may have 50-500 Pa·s viscosity, 5-72 h cure time, and 2-24 h pot life, for example.

For improving the adhesion of thermosetting silicone to a textile, the surface of textile or main-body fabric may be subjected to preparation such as primer treatment and plasma processing. Moreover, for enhancing the physical properties of thermosetting silicone and the adhesion of thermosetting silicone to a textile, a textile with silicone placed may be subjected to contact or non-contact heat treatment, high-energy treatment with high frequency, electron beam or ultraviolet ray, and the like at the drying and solidifying process.

Generally, adhesive silicone used in the present invention can be cured at the room temperature. When it is desirable to accelerate the cure at a spot with remarkably increased application amount or for a large-sized airbag, adhesive silicone may be subjected to heat treatment at a low temperature of about 40-100° C. or high-energy treatment as described above.

Preferably, the adhesion of adhesive silicone to thermosetting silicone is in such a condition to produce no interface peeling between the two, but cohesive failure of adhesive silicone. Without occurrence of peeling of a coating layer from an adhesive layer even when the junctions receive an impact upon deployment of the airbag, a gas leakage from the seams can be prevented for the airbag with sewed junctions.

Thermosetting and adhesive silicones use in the present invention may contain commonly-used additives for improving the workability, adhesion, surface characteristic, durability, and the like. Examples of the additives are cross-linking agent, silane-coupling agent, reaction accelerator, reaction retardant, adhesive agent, heat-resisting stabilizer, filler, antioxidant, light-resisting stabilizer, age resistor, lubricant, smoother, antitack agent, pigment, water-repellent, oil-repellent, masking agent, gloss agent, flame retardant, plasticizer and the like, or a mixture of two or more among them.

Particularly, the provision of excellent durability to adhesive silicone can be achieved by appropriate selection of reaction accelerator, adhesive agent, heat-resisting stabilizer, filler, and the like of the above additives. Examples of the filler are metallic oxides such as iron oxide and titanium oxide, hydroxide, and carbon. Examples of the adhesion agent are silane compounds having active group such as epoxy group, amino group, imino group, carboxyl group, mercapto group or the like, and alkyl and/or alkoxyl substituted.

The main-body fabrics may be superimposed with thermosetting silicone surfaces opposed to each other. The superimposition may be carried out with two pieces of fabric or one piece of fabric folded back. In some cases, the superimposition may be carried out with the outer periphery of two pieces of fabric superimposed folded back further, or with an overlap-width-like portion of larger one of two similar-shaped pieces of fabric folded on smaller one thereof.

In the present invention, it is preferable to apply not only joining with adhesive silicone, but joining by sewing to spots requiring particularly greater joining strength such as outer periphery of the bag and periphery of an inflator mounting hole. Since simple joining with adhesive silicone cannot resist an impact upon deployment of the airbag, sewing is particularly preferable when a gas leakage is difficult to restrain.

When sewing is also applied to spots requiring particularly greater joining strength, any specifications of sewing can be used if it allows reinforcement of the junctions. With yarn for forming the main-body fabric being fine, particularly, 250 dtex or less, it is preferable to carry out sewing in such a way as to satisfy the relationships of 1) $20 \leq T \leq 80$ and 2) $2 \leq T/S \leq 8$, where T is number count of thread, and S is number of stitches (times/cm).

In the present invention, when using needle thread and bobbin thread having different number count, it is desirable that both threads satisfy the relationships of 1) and 2). However, only one of the threads may satisfy the relationships of 1) and 2).

The style of stitch can be selected from various types such as lock stitch, multi-thread chain stitch, single welt stitch, overlock stitch, safety stitch, zigzag stitch, covering chain stitch, and a combination thereof in accordance with a fabric to be used, bag specifications, mounting spot, required joining strength, and the like.

Thread used in the present invention can be selected from chemosynthestic fiber threads and industrial threads formed out of nylon 6, nylon 66, nylon 46, polyester, vinylon, aramid, carbon, glass, and the like, and in the form of spun thread, filament double-twist thread, and filament resin-finished thread.

In the present invention, a fiber for forming the textile may be selected from aliphatic polyamide fiber obtained with nylon 6, nylon 66, nylon 46, nylon 610, nylon 612, copolymer, and mixture thereof; copolymerized polyamide fiber of aliphatic amine and aromatic carboxylic acid such as nylon 6T and nylon 9T; polyester fiber obtained with polyethylene terephthalate, polytrimethylene terephthalate, polybutylene terephthalate, polyethylene naphthalate, copolymer, and mixture thereof; aramid fiber obtained with paraphenylene terephthalic amide and copolymer of paraphenylene terephthal amide and aromatic ether; aromatic polyester fiber; vinylon fiber; ultrahigh-molecular-weight polyethylene fiber; fluorocarbon fiber including polytetrafluoroethylene; polysulphone fiber; polyphenylene sulfide (PPS) fiber, polyether etherketone (PEEK) fiber; polyimide fiber; polyether imide fiber; cellulosic fiber including high tenacity rayon; acrylic fiber; carbon fiber; glass fiber; silicon carbide (SiC) fiber; and alumina fiber. In some cases, the textile-forming fiber can include inorganic fiber such as metallic fiber comprising steel.

In order to enhance the spinning-ability, workability, and material durability, the textile-forming fiber may contain one or two or more of commonly-used additives. Example of the additives are heat-resisting stabilizer, antioxidant, light-resisting stabilizer, age resistor, lubricant, smoother, pigment, water-repellent, oil-repellent, masking agent such as titanium oxide, gloss agent, flame retardant, and plasticizer. In some case, fiber may be subjected to particular processing such as twisting, bulking, crimping, winding, or the like. The fiber may be in the form of long-fiber filament, short-fiber spun yarn, and composite yarn thereof.

In the present invention, a loom for manufacturing a textile can be selected from various looms for weaving ordinary industrial textiles. Examples of the looms are a shuttle loom, a water-jet loom (WJL), an air-jet loom (AJL), a rapier loom, and a projectile loom. The texture of textiles may be plain weave, mat or basket weave, twilled weave, grid or rip-stop weave, and composite weave thereof.

The airbag according to the present invention is a side airbag for reducing an impact of an occupant in the event of side collision of motor vehicles, and particularly, a side airbag which is accommodated in the folded state in a vehicle body on the periphery of a side window, i.e. front pillar, center pillar, rear pillar, roof side rail and the like, and is deployed like a curtain in the vicinity of the side window, i.e. lower space of the roof side rail in a cabin and defined by the front pillar, the center pillar or the rear pillar, with gas issuing from an inflator in the event of side collision.

A reinforcing fabric for reinforcing the periphery of the inflator mounting hole and the expanding inside of the airbag may include the same textile as that of the bag, or other textile thicker than that of the bag, e.g. textile formed out of nylon 66 fiber of 940 or 470 dtex. The reinforcing fabric can be used in one piece or a plurality of pieces. It is noted that the reinforcing fabric involves an antiflaming fabric for intercepting hot gas issuing from the inflator. In order to provide the heat resistance, the reinforcing fabric may be coated with heat-resisting resin such as silicone resin or fluorine-contained resin or heat-resisting rubber, or be formed out of a heat-resisting fiber such as aramid fiber.

The airbag according to the present invention, which serves essentially as a side airbag for reducing an impact in the event of side collision, may be applied to other particular spots in the form of a headrest bag for rear-end collision, a mini-bag for children, a seat-belt bag or air belt and the like, wherein the shape and volume are determined in accordance with the requirements.

The present invention will be described more concretely with reference to examples and comparative examples. In the examples and comparative examples, the performance evaluation of airbags was carried out on the following points:

1) Characteristics of Adhesive Silicone
 a) Hardness (JIS-A)
 The hardness was measured in conformity with JIS K6253.
 b) Fractural elongation
 The fractural elongation was measured in conformity with JIS K6251 in the initial state and after heat treatment at 100° C. during 250 h and 500 h. The shape of a test piece is Dumbbell No. 3.

2) Deployment Test
An inflator (hybrid inflator manufactured by Atlantic Research Corporation and having 150 kpa tank pressure) secured together with fixtures in an inflator insertion of a bag was deployed at a room temperature to observe the presence of damage at the junctions of the main-body fabric.

Figure 5:
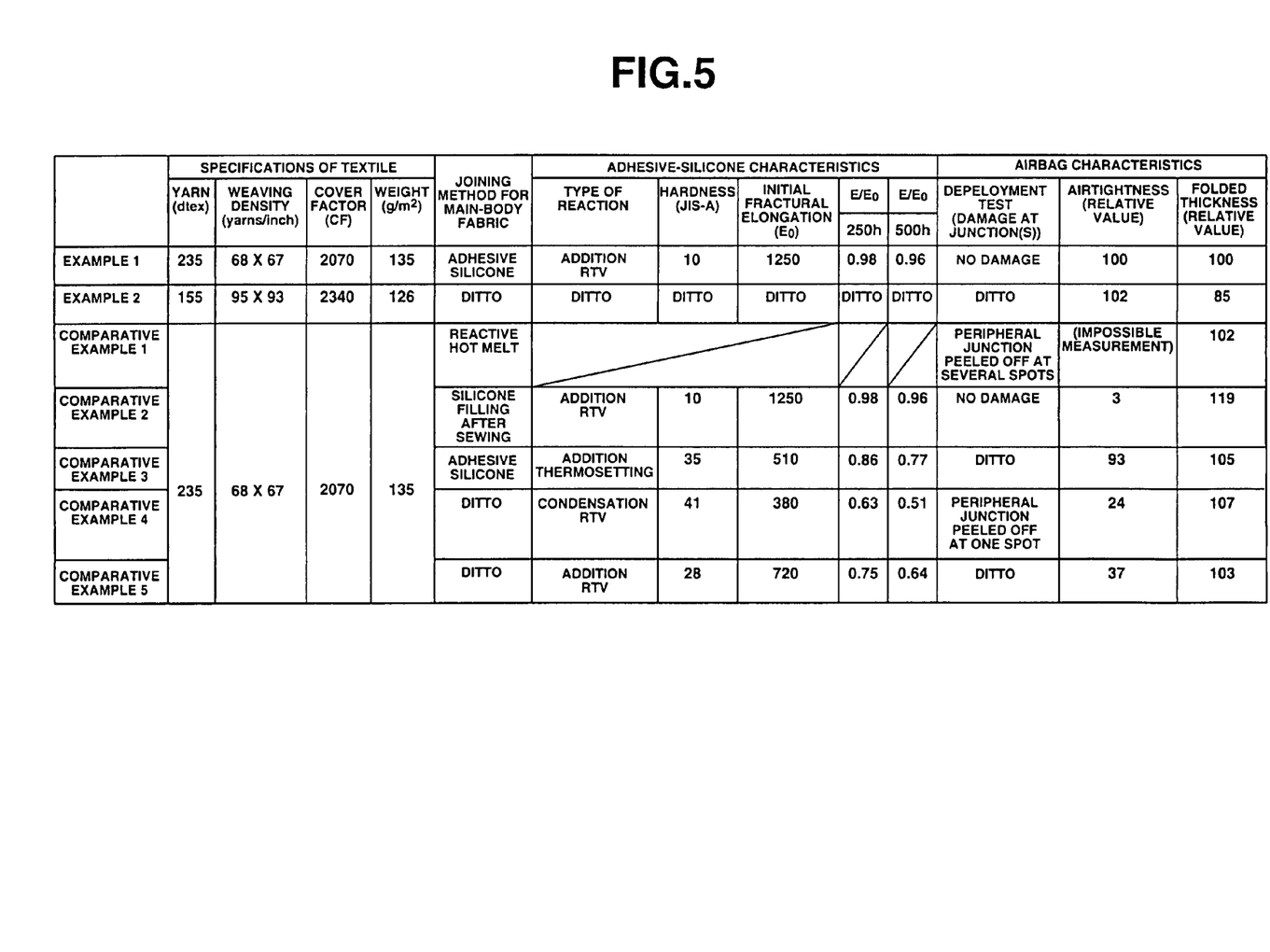
FIG. 5 is a table illustrating the results of performance evaluation for Examples 1-2 and Comparative examples 1-5.
Figure 6:
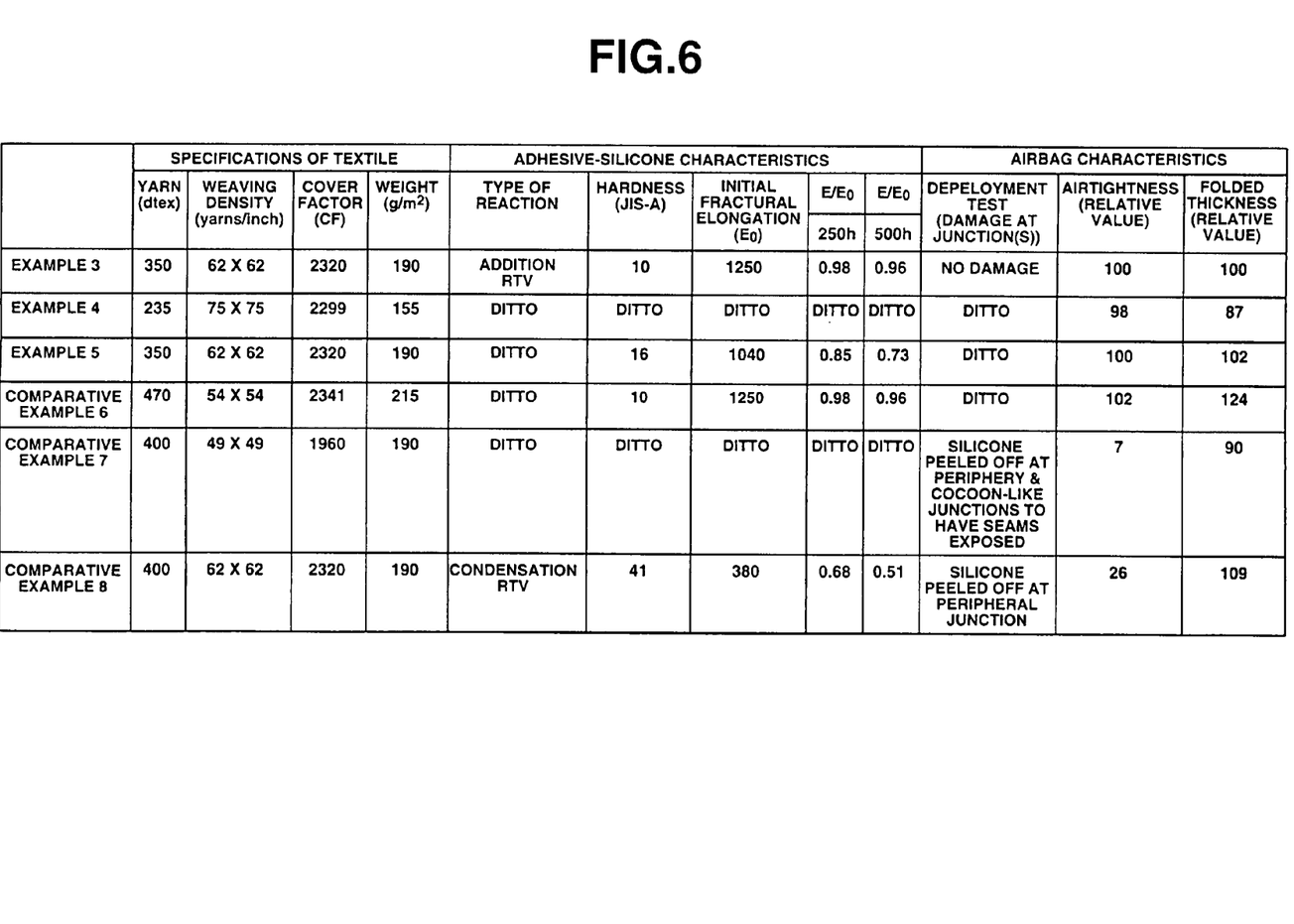
FIG. 6 is a table similar to FIG. 5, illustrating the results of performance evaluation for Examples 3-5 and Comparative examples 6-8.

3) Airtightness Test
Sewing the inflator insertion partly and closing the bag hermetically except a pressure-air supply part, the bag was filled with pressure air. When the bag internal pressure reached 50 kpa, the supply of pressure air was stopped to measure a time until a pressure gauge arranged in the vicinity of a pressure-air supply valve becomes roughly 0 kpa. FIG. 5 shows a relative airtightness in each example with respect to a reference airtightness 100 in Example 1, and FIG. 6 shows a relative airtightness in each example with respect to a reference airtightness 100 in Example 3.

4) Folded Thickness
With the bag folded 10 times substantially in parallel along its length and like bellows, the thickness was measured. FIG. 5 shows a relative thickness in each example with respect to a reference thickness 100 in Example 1, and FIG. 6 shows a relative thickness in each example with respect to a reference thickness 100 in Example 3.

EXAMPLE 1

Figure 3:
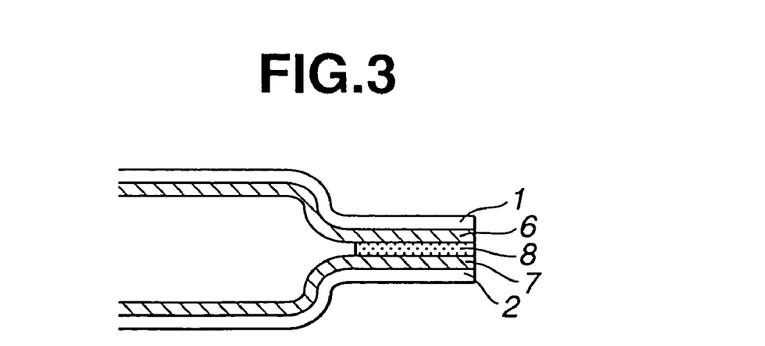
FIG. 3 is a fragmentary sectional view showing a peripheral junction of the airbag

Using yarn of nylon 66 fiber of 235 dtex/72 f (base yarn strength: 8.0 cN/dtex), a plain weave textile was manufactured having 66 yarns/inch weave density for both warp and weft. The textile was boiled off and set by heat. Then, one side of the textile was coated with thermosetting silicone resin (see 6, 7 in FIGS. 3-4)(SRX625B™ manufactured by Dow Corning Toray Silicone Co., Ltd.+xylene solution containing 1% catalyst, 1% pigment, and 2% reaction accelerator) by 20 g/m² (on the basis of solid matter), which was subjected to drying and heat treatment, obtaining a coated fabric. The density of the textile after coating was 68 yarns/inch for warp, and 67 yarns/inch for weft. The weight of the textile was 135 g/m² before coating, and 155 g/m² after coating.

Figure 1:
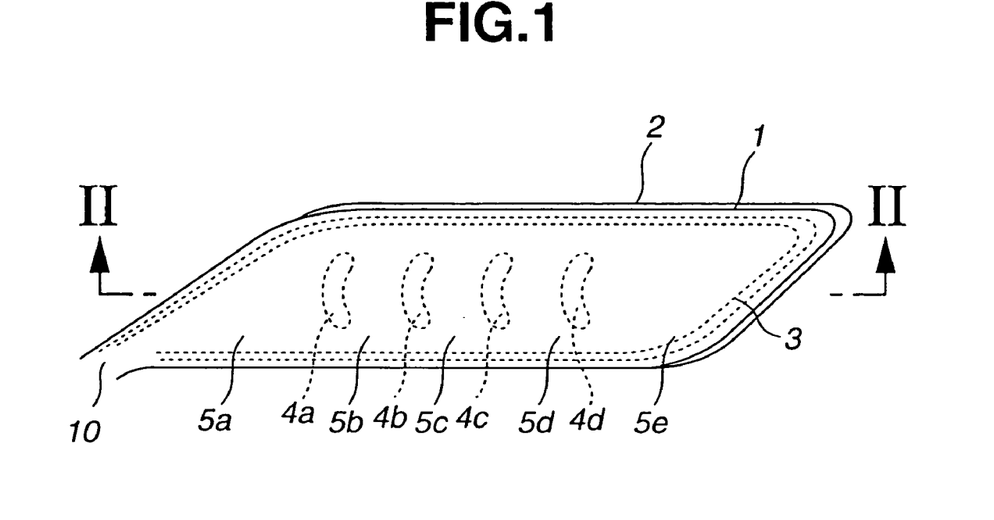
FIG. 1 is a perspective view showing an embodiment of an airbag before deployment as seen from a side window.
Figure 2:
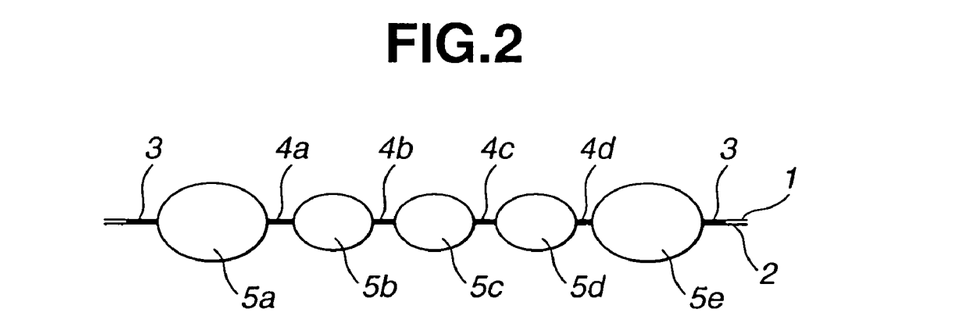
FIG. 2 is a sectional view taken along the line II-II in FIG. 1.

Next, referring to FIGS. 1-2, the textile was cut to obtain two pieces 1, 2 of coated fabric roughly like a parallelogram for main-body fabric. The length of each piece is 160 cm for upper side, 180 cm for lower side, 65 cm for right side and 80 cm for left side, and the altitude is about 55 cm. An outer periphery 3 and four cocoon-like portions 4a-4d of the first piece 1 were further coated with adhesive silicone 8 or addition solventless two-liquid RTV silicone (manufactured by Dow Corning Toray silicone Co., Ltd.) by 0.25 mm thickness and 25 mm width. The second piece 2 was placed thereon. The cocoon-like junctions are about 30 cm long and about 15 cm wide. For the characteristics of adhesive silicone after cure, the JIS-A hardness was 10, and the initial fractural elongation was 1,250%. In FIGS. 1-2, reference numerals 5a-5e designate expandable portions of the airbag.

Then, condition at the junctions after deployment, airtightness, and folded thickness were observed and evaluated on the points of the performance evaluation. FIG. 5 reveals that the airbag in Example 1 is superior to a conventional airbag in Comparative example 3 in airtightness and compactness.

EXAMPLE 2

The airbag in Example 2 was manufactured and evaluated in the same way as that in Example 1 except that using yarn of 155 dtex/68 f (base yarn strength: 7.3 cN/dtex), a plain weave textile was manufactured having 92 yarns/inch weave density for both warp and weft.

The density of the textile after coating was 95 yarns/inch for warp, and 93 yarns/inch for weft. The weight of the textile was 126 g/m$^2$ before coating, and 146 g/m$^2$ after coating.

The airbag in Example 2 provides substantially the same degree of airtightness as that in Example 1, and very small folded thickness, i.e. superb compactness.

COMPARATIVE EXAMPLE 1

The airbag in Comparative example 1 was manufactured and evaluated in the same way as that in Example 1 except that the main-body fabrics were joined with reactive hot-melt resin (HI-BON 4820 ™ manufactured by Hitachi Kasei Polymer Co., Ltd.) in place of adhesive silicone, and were heated and pressurized at 90° C. for 2 min. under 0.5 kgf/cm$^2$ surface pressure.

The airbag in Comparative example 1 provides substantially the same folded thickness as that in Example 1, but cannot provide sufficient airtightness since the peripheral junction was peeled off at several spots before the bag internal pressure reaches 50 kpa.

COMPARATIVE EXAMPLE 2

The airbag in Comparative example 2 is similar to that in Example 1, but in place of adhesive silicone, the main-body fabrics were joined by sewing the outer periphery and four junctions of the bag inside with thread of nylon 66 fiber (number count No. 8 for both needle thread and bobbin thread) at 4.0 times/cm in number of stitches. The outer periphery was stitched by double chain in two rows, and the bag inside was lock stitched. The surface of all seams and the outside of an outer seam at the outer periphery were coated with moisture-setting silicone resin (RTV rubber SH790 ™ manufactured by Dow Corning Toray Co., Ltd.) to achieve filling.

The airbag in Comparative example 2 is low in airtightness, and large in folded thickness, i.e. low in compactness.

COMPARATIVE EXAMPLE 3

The airbag in Comparative example 3 was manufactured and evaluated in the same way as that in Example 1 except that additive thermosetting silicone (SE1700 ™ manufactured by Dow Corning Toray Co., Ltd.) was used as adhesive silicone, and was cured by heat at 150° C. for 10 min. For the characteristics of adhesive silicone after cure, the JIS-A hardness was 35, and the initial fractural elongation was 510%.

The airbag in Comparative example 3 is slightly lower in airtightness, and slightly larger in folded thickness than the airbag in Example 1.

COMPARATIVE EXAMPLE 4

The airbag in Comparative example 4 was manufactured and evaluated in the same way as that in Example 1 except that condensation RTV silicone (SE9145 ™ manufactured by Dow Corning Toray Co., Ltd.) was used as adhesive silicone. For the characteristics of adhesive silicone after cure, the JIS-A hardness was 41, and the initial fractural elongation was 380%.

The airbag in Comparative example 4 is lower in airtightness (the peripheral junction is peeled off at one spot in the vicinity of the mounting hole), and larger in folded thickness than the airbag in Example 1.

COMPARATIVE EXAMPLE 5

The airbag in Comparative example 5 was manufactured and evaluated in the same way as that in Example 1 except that silicone having different characteristics after cure (TSE3456T™ manufactured by GE Toshiba Silicones Co., Ltd.) was used as adhesive silicone. For the characteristics of adhesive silicone after cure, the JIS-A hardness was 28, and the initial fractural elongation was 720%.

The airbag in Comparative example 5 is lower in airtightness (the peripheral junction is peeled off at one spot in the vicinity of the mounting hole) than the airbag in Example 1.

EXAMPLE 3

Using yarn of nylon 66 fiber of 350 dtex/72 f (base yarn strength: 8.6 cN/dtex), a plain weave textile was manufactured having 60 yarns/inch weave density for both warp and weft. The textile was boiled off and set by heat. Then, one side of the textile was coated with thermosetting silicone resin by 30 g/m$^2$ (on the basis of solid matter), which was subjected to drying and heat treatment, obtaining a coated fabric. The density of the textile after coating was 62 yarns/inch for both warp and weft. The weight of the textile was 190 g/m$^2$ before coating, and 220 g/m$^2$ after coating.

Next, in the same way as in Example 1, the textile was cut to obtain two pieces 1, 2 of coated fabric for main-body fabric. Referring to FIG. 1, a coated outer periphery 3 and four cocoon-like portions 4a-4d of the first piece 1 were further coated with the same adhesive silicone 8 as that in Example 1 by 0.8 mm thickness and 25 mm width. The second piece 2 on the side of a coated surface was placed thereon.

Figure 4:
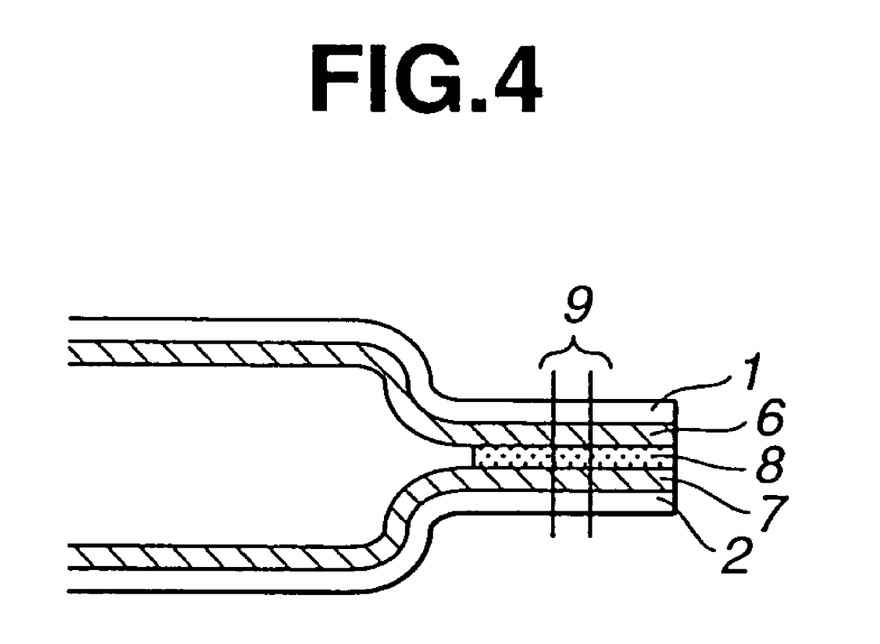
FIG. 4 is a view similar to FIG. 3, showing another embodiment of the present invention.

Referring to FIG. 4, after leaving the superimposed pieces of coated fabric for 48 h at the room temperature, the outer periphery 3 and inside junctions 4a-4d of the fabric were sewed with nylon thread 9 along the adhesive-silicone applied portion. The style of sewing was lock stitch in two rows, and 3.5 times/cm in number of stitches.

FIG. 6 reveals that the airbag in Example 3 is excellent in both airtightness and compactness.

EXAMPLE 4

The airbag in Example 4 was manufactured and evaluated in the same way as that in Example 3 except that using yarn of 235 dtex/72 f (base yarn strength: 8.5 cN/dtex), a plain weave textile was manufactured having 73.5 yarns/inch weave density for both warp and weft, wherein adhesive silicone is of 1.0 mm coating thickness and 100° C.×1 h cure condition, and thread number count is No. 20 for needle thread and No. 8 for bobbin thread with 5.0 times/cm in number of stitches.

FIG. 6 reveals that the airbag in Example 4 is excellent in airtightness and superb in compactness.

EXAMPLE 5

The airbag in Example 5 was manufactured and evaluated in the same way as that in Example 3 except that addition RTV silicone (manufactured by Dow Corning Toray Co., Ltd.) is used as adhesive silicone, wherein the JIS-A hardness is 16, and the initial fractural elongation is 1,040%.

FIG. 6 reveals that the airbag in Example 5 is excellent in both airtightness and compactness despite slightly lower ratio E/Eo of the initial fractural elongation Eo to the fractural elongation E after 500 h treatment.

COMPARATIVE EXAMPLE 6

The airbag in Comparative example 6 was manufactured and evaluated in the same way as that in Example 3 except that using yarn of 470 dtex/72 f (base yarn strength: 8.6 cN/dtex), a plain weave textile was manufactured having 54 yarns/inch weave density after coating.

The airbag in Comparative example 6 is excellent in airtightness, but large in folded thickness, i.e. low in compactness.

COMPARATIVE EXAMPLE 7

The airbag in Comparative example 7 was manufactured and evaluated in the same way as that in Example 3 except that using yarn of 400 dtex/72 f (base yarn strength: 8.6 cN/dtex), a plain weave textile was manufactured having 49 yarns/inch weave density after coating.

The airbag in Comparative example 7 is excellent in compactness but inferior in airtightness (greater gas leakage at the junctions).

COMPARATIVE EXAMPLE 8

The airbag in Comparative example 8 was manufactured and evaluated in the same way as that in Example 3 except that the same condensation RTV silicone as that in Comparative example 4 was used as adhesive silicone.

The airbag in Comparative example 8 is low in airtightness (the junctions are partly peeled off), and large in folded thickness, i.e. low in compactness.

The entire contents of Japanese Patent Applications 2001-185725 and 2000-242120 are incorporated herein by reference.

What is claimed is:

1. An airbag for a motor vehicle, comprising:
    first and second portions which form a main body of the airbag, the first and second portions being superimposed so that the first portion has a side opposed to a side of the second portion, the first and second portions comprising a textile, the textile having 400 dtex or less yarn, 200 g/m or less weight, and 2,000 or more cover factor;
    a first silicone placed on the opposed sides of the first and second portions, the first silicone comprising a thermosetting silicone; and
    a second silicone interposed between the opposed sides of the first and second portions at a junction thereof, the second silicone comprising a solventless addition room-temperature-vulcanizing adhesive silicone, the second silicone having 20 or less JIS-A hardness and 800% or more initial fractural elongation after cure.

2. The airbag as claimed in claim 1, wherein the textile has 235 dtex or less yarn and 150 g/m² or less weight.

3. The airbag as claimed in claim 1, wherein the cover factor of the textile is 2,000-2,600.

4. The airbag as claimed in claim 1, wherein at least part of the junction of the first and second portions is sewed with thread.

5. The airbag as claimed in claim 1, wherein the first silicone has an application amount of 10-100 g/m² on a basis of solid matter.

6. The airbag as claimed in claim 1, wherein the JIS-A hardness of the second silicone is 2-15.

7. The airbag as claimed in claim 1, wherein the initial fractural elongation of the second silicone is 1,000-1,500%.

8. The airbag as claimed in claim 1, wherein the second silicone has a ratio of the initial fractural elongation to the fractural elongation after 250 h treatment at 100° C. after cure is 1:0.8 or more.

9. The airbag as claimed in claim 1, wherein the second silicone has the ratio of the initial fractural elongation to the fractural elongation after 500 h treatment at 100° C. after cure is 1:0.8 or more.

10. The airbag as claimed in claim 8, wherein the second silicone has an application amount of 100-1,000 g/m² on a basis of solid matter.

11. The airbag as claimed in claim 8, wherein the second silicone has a 0.1-1.2 mm thickness.

12. The airbag as claimed in claim 8, wherein the second silicone comprises a main agent including vinyl dimethylpolysiloxane, a cross-linking agent including a hydrogen-silane-radical containing compound, and a curing catalyst including a platinum compound.

13. The airbag as claimed in claim 8, wherein the second silicone has 50-500 Pa·s viscosity, 5-72 h cure time, and 2-24 h pot life.

14. The airbag as claimed in claim 4, wherein when the textile has 250 dtex or less yarn, the thread satisfies relationships of 1) $20 \leq T \leq 80$ and 2) $2 \leq T/S \leq 8$, where T is number count of thread, and S is number of stitches (times/cm).

15. The airbag as claimed in claim 14, wherein when using needle and bobbin threads having different number count, at least one of the threads satisfies the relationships of 1) $20 \leq T \leq 80$ and 2) $2 \leq T/S \leq 8$, where T is number count of thread, and S is number of stitches (times/cm).

16. The airbag as claimed in claim 2, wherein the yarn of the textile comprises at least one of aliphatic polyamide fiber, copolymerized polyamide fiber, polyester fiber, aramid fiber, aromatic polyester fiber, vinylon fiber, ultrahigh-molecular-weight polyethylene fiber, fluorocarbon fiber, polysulphone fiber, polyphenylene sulfide (PPS) fiber, polyether etherketone (PEEK) fiber, polyimide fiber, polyether imide fiber, cellulosic fiber, acrylic fiber, carbon fiber, glass fiber, silicon carbide (SiC) fiber, and alumina fiber.

17. The airbag as claimed in claim 1, further comprising a reinforcing fabric which reinforces a particular portion inside the airbag.

18. A motor vehicle, comprising:
    an airbag mounted in a vicinity of a side window of the motor vehicle, the airbag comprising:
    first and second portions which form a main body of the airbag, the first and second portions being superimposed so that the first portion has a side opposed to a side of the second portion, the first and second portions comprising a textile, the textile having 400 dtex or less yarn, 200 g/m² or less weight, and 2,000 or more cover factor;
    a first silicone placed on the opposed sides of the first and second portions, the first silicone comprising a thermosetting silicone; and
    a second silicone interposed between the opposed sides of the first and second portions at a junction thereof, the second silicone comprising a solventless addition room-temperature-vulcanizing adhesive silicone, the second silicone having 20 or less JIS-A hardness and 800% or more initial fractural elongation after cure.

19. An airbag for a motor vehicle, comprising:
    first and second portions which form a main body of the airbag, the first and second portions being superimposed so that the first portion has a side opposed to a side of the second portion, the first and second portions comprising a textile, the textile having 400 dtex or less yarn, 200 g/m or less weight, and 2,000 or more cover factor;

a first silicone placed on the opposed sides of the first and second portions, the first silicone comprising a thermosetting silicone; and a second silicone interposed between the opposed sides of the first and second portions at a junction thereof, the second silicone comprising a solventless addition room-temperature-vulcanizing adhesive silicone.

20. The airbag as claimed in claim 19, wherein the junction is located at an outer periphery of the first and second portions.

21. The airbag as claimed in claim 1, wherein the junction is located at an outer periphery of the first and second portions.

22. The airbag as claimed in claim 18, wherein the junction is located at an outer periphery of the first and second portions.

23. The airbag as claimed in claim 1, wherein the opposed sides of the first and second portions of the main body of the airbag both comprise the first silicone at a junction and wherein the second silicone is interposed between the first and second portions at the junction.

24. The airbag as claimed in claim 1, wherein the second silicone is selectively applied at the junction.

25. The airbag as claimed in claim 18, wherein the opposed sides of the first and second portions of the main body of the airbag both comprise the first silicone at a junction and wherein the second silicone is interposed between the first and second portions at the junction.

26. The airbag as claimed in claim 18, wherein the second silicone is selectively applied at the junction.

27. The airbag as claimed in claim 1, wherein the first and second portions are coated with the first silicone; and the second silicone adheres to the first silicone at the junction, and joins the first and second portions.

* * * * *